(No Model.) 2 Sheets—Sheet 1.
G. CROMPTON.
MECHANICAL MOVEMENT.
No. 274,914. Patented Apr. 3, 1883.
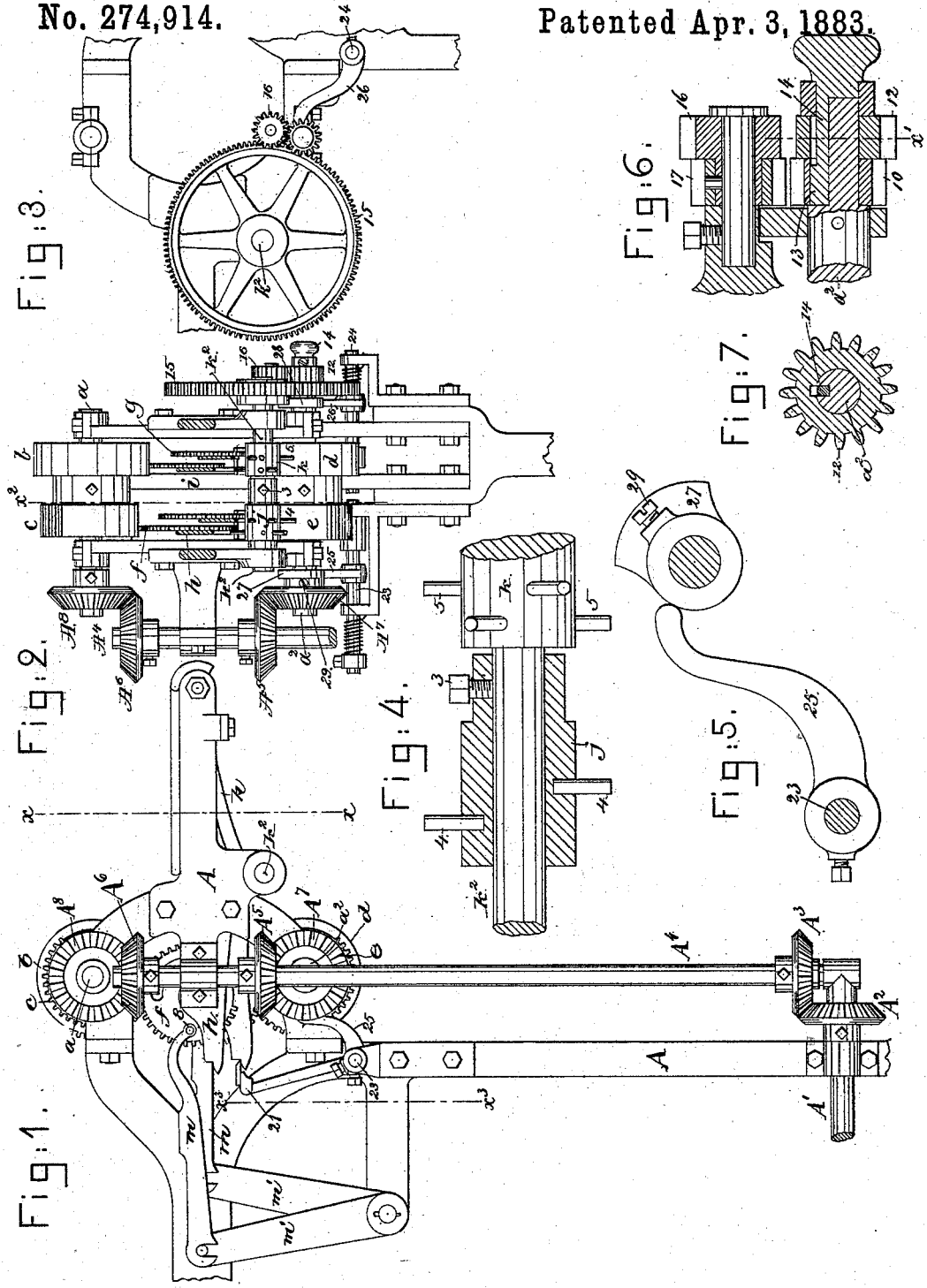
Witnesses.
Fred S. Powell
John F. C. Pinkert
Inventor.
George Crompton
by Crosby & Gregory attys.

(No Model.) 2 Sheets—Sheet 2.
G. CROMPTON.
MECHANICAL MOVEMENT.
No. 274,914. Patented Apr. 3, 1883.
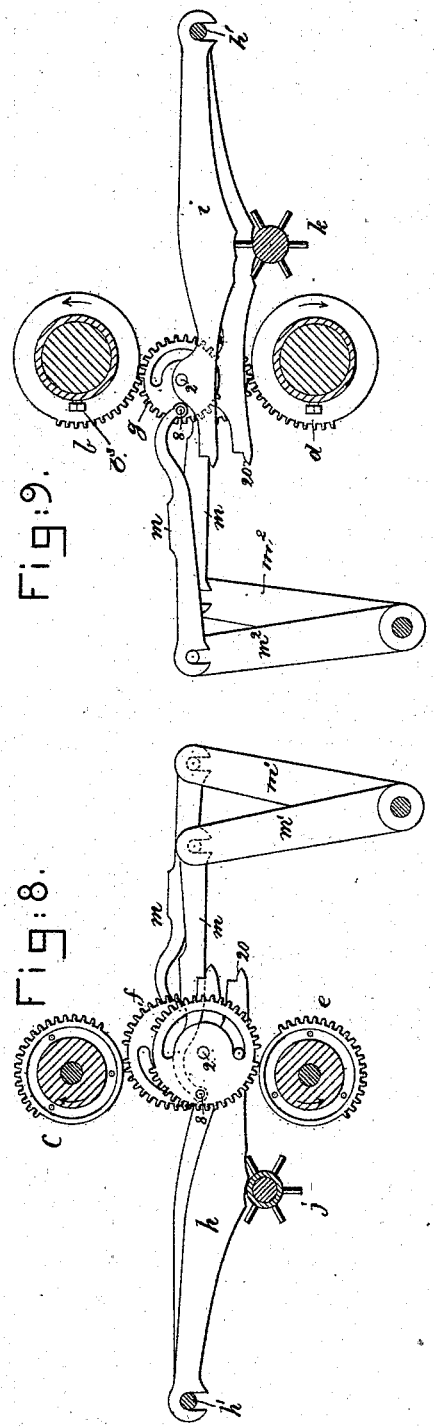
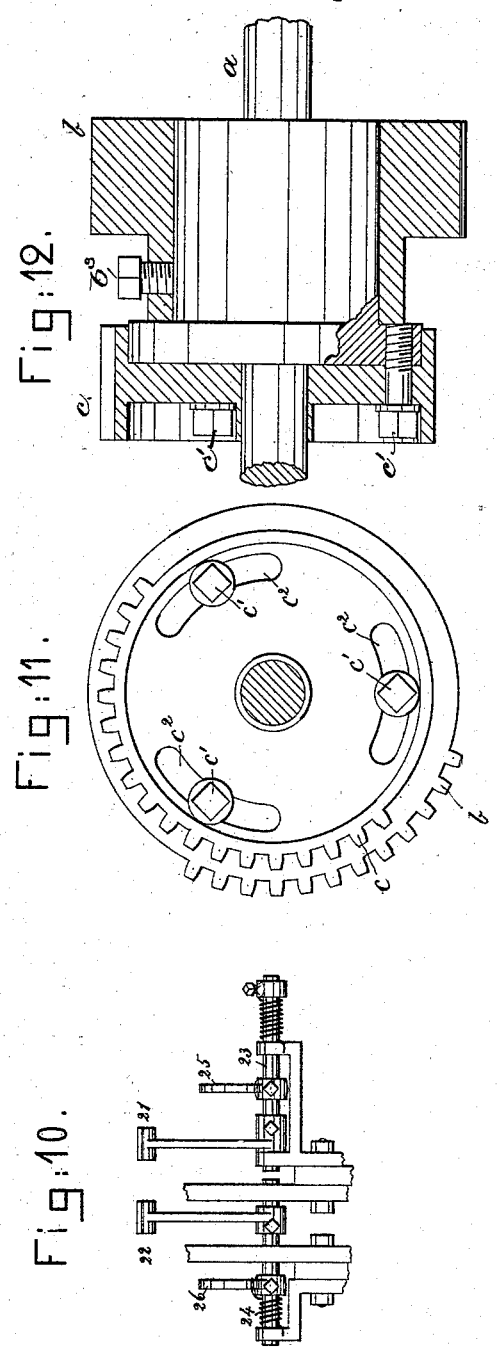
Witnesses.
Fred N. Powell.
F. E. Poukert
Inventor.
George Crompton
by Crosby & Gregory Attys.

UNITED STATES PATENT OFFICE.

GEORGE CROMPTON, OF WORCESTER, MASSACHUSETTS.

MECHANICAL MOVEMENT.

SPECIFICATION forming part of Letters Patent No. 274,914, dated April 3, 1883.

Application filed November 6, 1882. (No model.)

*To all whom it may concern:*

Be it known I, GEORGE CROMPTON, of Worcester, in the county of Worcester and State of Massachusetts, have invented an Improvement in Mechanical Movements, of which the following description, in connection with the accompanying drawings, is a specification, like letters on the drawings representing like parts.

This invention has for its object the construction of a system of gearing containing upper and lower partial gear, which at times respectively engage and turn in one and then in the other direction, two or more crank-carrying toothed wheels located between the said partial gear, so that the said partial gear, although mounted upon shafts rotated at the same speed and in unison, are enabled to actuate levers or arms joined to the cranks of the said crank-carrying toothed wheels in a different order of time, so that one of the said levers or arms may effect its work at one time and the other at a different time.

In this invention the two parallel shafts which carry the partial gear are moved at the same speed and in unison; but the partial gear thereon are shown as of different diameter, and the intermediate crank-carrying toothed wheels are also shown as of different diameter, thus enabling the levers or arms joined to the said cranks to be moved positively in different order of time from two shafts running at equal speed. The interval of time between the movement of the arms or levers actuated by these intermediate crank-carrying toothed wheels is regulated by adjusting the hubs of the two partial gear carried by the same shaft, so that the leading tooth of one will enter the engaging space of its crank-carrying toothed wheel earlier than the leading tooth of the hub of the partial gear adjacent to it on the same shaft.

In this invention the independent levers, placed side by side and actuated by pins of pin-wheels or pattern-surfaces having a common center, and moved to place the teeth of the crank-carrying toothed wheels in contact with the partial gear, are held or locked in their lowest position, while the under partial gear are operative to turn the toothed wheels, the said locking being accomplished by means of independent locking devices, which have combined with them devices whereby the locking devices may be operated at different orders of time, thus enabling one of the levers which carry the toothed wheels which co-operate with one set of partial gear to be released earlier than an adjacent lever having on it a toothed wheel to co-operate with the other set of partial gears, thus enabling each toothed wheel to be placed in engagement at just the proper time with the partial gear which is to move it. The locking device, by its action upon the lever, holds the toothed wheel carried by it into positive engagement with the under partial gear; but when the said locking device is removed from the lever which it is to hold at certain times the said lever is free to be lifted by a pin or projection of a pattern-cylinder, which pin acts to hold the lever up firmly and compel the engagement of the toothed wheel carried by it with the upper partial gear. The pattern-surface having the pins which move one set of the levers which hold the crank-carrying toothed wheels of one diameter is made adjustable with relation to the common shaft of the pattern-surface which controls the position of the lever or levers which hold the adjacent crank-carrying toothed wheels of a different diameter, thereby enabling the said levers to be operated at different intervals or orders of time.

My invention consists in a novel mechanical organization, as described, having its different parts adapted to operate in connection with each other to vary the period or times of movement of some of them with relation to others of them, and as will be set forth in the claims at the end of this specification.

Figure 1 represents in side elevation parts of an organized mechanism to illustrate this present invention in mechanical movement; Fig. 2, a section, showing most of the parts of Fig. 1, at the left of the dotted line *x*; Fig. 3, a partial view of the rear side of Fig. 1, the parts distinctly shown in Fig. 1 being omitted. Fig. 4 is a partial sectional detail of the pattern-surface; Fig. 5, a detail of one of the lever-locking devices, to be referred to. Fig. 6 is a sectional detail of the gearing to reverse the movement of the pattern-surface, if desired; Fig. 7, a sectional detail of Fig. 6 in the line $x'$; Fig. 8, a sectional detail, showing the partial gear, crank-carrying toothed wheels, their carrying-levers, pattern-surface, and connecting rods and levers at the left of the dotted line $x^2$, Fig. 2; Fig. 9, a like section of similar devices at the right of the said line; Fig. 10, a detail at the right of the line $x^3$, Fig. 1, to show the two independent carrying-lever locking devices. Fig. 11 is an enlarged end view, showing one of the shafts of the partial gear, with the different-sized and adjustable tooth-carrying portions or hubs thereon, and Fig. 12 is a partial longitudinal section of Fig. 11.

The frame-work A, of suitable shape to contain the mechanism to be described, has a driver-shaft, A', provided with a bevel-gear, $A^2$, which engages a bevel-gear, $A^3$, on and turns an upright shaft, $A^4$, having upon it two bevel-gears, $A^6$, which respectively engage the bevel-gears $A^7 A^8$ on the respective shafts $a$ $a^2$, which receive upon them the partial gears to be described. The shaft $a$ has fastened to it, or to a hub, $a^2$, thereon, a partial gear, $b$, it being made adjustable by the set-screw $b^3$, and to this same shaft $a$, or to a flange of a hub thereon, as shown in Fig. 12, is adjustably attached a partial gear, $c$, of smaller diameter than the gear $b$. The partial gear $c$ is shown as adjustably attached to the flange of the hub of the shaft $a$, referred to, by set-screws $c'$, extended through slots $c^2$ of the web of the said gear. These partial gear $b$ $c$, on the same common shaft $a$, are of different diameters, as clearly shown in Figs. 2, 11, and 12, and, as herein shown, each gear $b$ $c$ has a sufficient number of teeth to impart a semi-rotation to the crank-carrying toothed wheels to be operated by it, and each gear is adjustably connected with the said common shaft $a$, so that the leading tooth of the series of teeth of the gear may be made to come into action or operation sooner or later than the leading tooth of the section of teeth of the gear $c$, or vice versa; or, if desired, the said leading teeth may come into operation simultaneously.

The under partial gear, $d$, and the under partial gear, $e$, on the one common shaft $a^2$, are in construction just the same as the corresponding upper gears, $b$ $c$, and are attached to one common shaft and made adjustable in like manner, and by devices just such as employed to confine and adjust the gears $b$ $c$ on the shaft $a$, common to them. The crank-carrying toothed wheels $f$, of larger diameter, (see Fig. 8,) placed between the partial gears $c$ $e$, of smallest diameter, and the crank-carrying toothed wheels $g$, of least diameter, and placed between the partial gears $b$ $d$, of greatest diameter, as in Fig. 9, are each carried by pins or studs 2 of like carrying-levers $h$ $i$, having their fulcra on a common rod, $h'$, and the said levers $h$ $i$, intermediate their fulcra and the toothed wheels thereon, extend each over a separate pattern-surface, $j$ $k$, having a common shaft or axis of motion, and pins or projections of the said pattern-surfaces strike against and at times lift the said levers, so that the toothed wheels carried by them are at suitable times thrown into engagement with the upper partial gears and held in engagement while the toothed wheels are turned partially around.

As herein shown, the pattern-surface $j$, made as a sleeve, is adjustably attached by set-screw 3 to the shaft $k^2$ of the pattern-surface $k$, and the said pattern-surfaces, turning about the same axis or center of motion, are made adjustable, so that the row of pins 4 may come into action sooner or later than the row of pins 5, and thus lift the levers above them, so as to cause the toothed wheels carried by them to be placed into engagement sooner or later with the partial gears which operate them.

Each toothed wheel $f g$ has a like crank-pin, 8, which is connected respectively, by a like connecting-rod, $m$, with the respective series of levers $m' m^2$, which are to be moved at different times, and to be started at different periods of time with relation to the time occupied by each rotation of shaft $A^4$, or to be started and moved at the same period of time, if so desired.

The end of shaft $a^2$ has loose upon it two pinions, 10 12, each having a slot at the interior of its hub to receive a projection, 13, of a key, 14, fitted to slide in a groove of shaft $a^2$, the said projection, when the key is in, engaging and locking the pinion 10 to the shaft $a^2$, as in Fig. 6, and leaving pinion 12 loose thereon; but when the key is drawn out the projection 13 enters the groove of pinion 12, and in turn locks it to the shaft $a^2$, and leaves pinion 10 loose thereon. Pinion 10 is in mesh with the toothed wheel 15, fast on the shaft $k^2$ of the pattern cylinder or shaft $k$, and when the pinion 10 is fast to shaft $a^2$ it will turn the wheel 15 in one direction; but when the pinion 12 is fast to the shaft $a^2$ the said pinion turns the pinion 16, having fast to its hub the pinion 7, (see Fig. 6,) which latter, in gear with the wheel 15, then rotates it and the pattern-cylinder in the direction the reverse of that when the pinion 10 was operative, as described.

The front ends of the levers of each series of carrying-levers $h$ $i$ are shouldered, as at 20, to be acted upon by locking devices 21 22, (shown best in Fig. 10,) and represented as levers with hooked heads, the said levers being attached respectively to rock-shafts 23 24, having respectively arms 25 26, which are acted upon respectively by cams 27 28, adjustably secured by a like set-screw, 29, to the shaft $a^2$. These cams are adjustable, so that the said locking devices may be moved sooner or later and be disengaged from the notched ends of the levers $h$ and $i$ at different periods of time, thus releasing the said levers, before held in locked position, leaving the said levers free to be lifted at the proper or necessary time, according to the position of the pins of the pattern-surfaces which actuate them. Each locking device is thrown forward by a suitable spring on the rock-shaft which carries it, to engage and lock the notched ends 20 of the said levers $h$ and $i$, when the levers are in their lowest position, or are unsupported by a pin, 4 or 5.

The simplest form of my invention would be represented by two upper and two lower partial gear, each pair of upper gear being on one shaft and each pair of lower gear being on another shaft, and one partial gear of each pair made adjustable on the shaft, in order that the leading tooth of one of the said pair of the gear may be made to engage and turn the toothed wheel in engagement with it before the gear on the same shaft starts to move the toothed wheel in engagement with it. To enable one of the set of gears side by side to operate in advance of the other, supposing that one of the upper partial gear is next to turn one of the toothed wheels, the locking device for the carrying-levers of the crank-carrying toothed wheel first to be moved must be disengaged from the said lever in advance of the disengagement of the locking device holding the levers last to be moved; and so, also, one of the pattern-surfaces must be adjusted to make its pins operate sooner than the pins of the other pattern-surface adjustably held on the same shaft.

By adjusting the partial gears held side by side on the same shaft, and by adjusting the locking devices and pattern-surfaces co-operating with each set of gear, so as to move the levers and place the toothed wheels carried by them in engagement with the said partial gear at periods of time corresponding with the periods of movement of the said partial gear, the commencement of the movement of the levers $m'$ and $m^2$ may be separated by a greater or less interval of time, and this would be done were all the partial gears of like diameter and all the toothed wheels $f$ $g$ of like diameters.

By making the two partial gears $d$ of one diameter, and the gears $c$ $e$ of another diameter, and the toothed wheels $f$ $g$ of different diameter, as described and shown, I am enabled to vary the speed at which the cranks on the toothed wheels operate to turn the levers $m^2$ $m'$, actuated by them, so that the levers $m^2$ may be moved at a faster speed than the levers $m'$, thus enabling the said levers $m^2$ to be moved either out or in in a less period of time than the levers $m'$, the time occupied by each of the levers $m^2$ $m'$ requiring more or less of the time of each rotation of the shaft $A^4$, which actuates the shafts carrying the partial gears, so that, for instance, the crank-carrying toothed wheels and levers $m^2$ may be made to operate while the shaft $A^4$ makes a certain number of degrees of its rotation, and the lever $m'$ be made to operate while the said shaft $A^4$ is passing through other degrees of its rotation; or the movement of either lever $m^2$ $m'$ may be made to occupy any portion of the time occupied by the shaft $A^4$ in making a complete rotation.

I claim—

1. Two sets of carrier-levers, $h$ $i$, two pattern-surfaces to move the said levers about their fulcra, crank-carrying toothed wheels mounted upon the said levers, connecting-rods attached to the crank-pins of the said toothed wheels, and levers with which the said connecting-rods are attached, combined with two sets of partial gears side by side, one of the partial gears of each set being made adjustable with relation to the other gear at the side of it to enable the leading tooth of one of the said gears to be adjusted into position to operate sooner than the gear at the side of it, as and for the purpose set forth.

2. The two sets of carrying-levers $h$, $i$, two pattern-surfaces to support and move the said levers, one of the said pattern-surfaces being made adjustable with relation to the other, toothed wheels mounted on the said levers, and partial gears to turn the said toothed wheels, combined with two independently-actuated locking devices to release the said levers at different times, or one after the other, substantially as and for the purpose described.

3. Two sets of carrying-levers, $h$ $i$, two pattern-surfaces to move the said levers, and two toothed wheels of different diameters mounted respectively on the said levers, combined with two sets of partial gears of different diameter, rotating shafts to carry the said partial gear, to thus move the crank-carrying toothed wheels of smallest diameter faster than the crank-carrying toothed wheels of the greatest diameter, and with connecting-rods and levers $m'$ $m^2$, joined therewith, whereby the said levers $m'$ $m^2$ are actuated at different speeds by the said toothed wheels set in motion by gears on shafts rotated at uniform speed, substantially as described.

4. The two gears $d$ $e$, placed side by side, and made adjustable with relation to each other, and carrying-levers $h$ $i$, and toothed wheels mounted thereon, combined with two independent locking devices to release the said levers at different orders of time, substantially as described.

5. The two parallel shafts $a$ $a^2$, and means to rotate them at the same speed in opposite directions, and two partial gear on each of the said shafts, one of the said gears being adjustable with relation to its fellow gear, as described, combined with intermediate toothed wheels, as described, and with mechanism, substantially as described, to carry and be moved by the said toothed wheels, for the purpose set forth.

In testimony whereof I have signed my name to this specification in the presence of two subscribing witnesses.

GEO. CROMPTON.

Witnesses:
J. B. SYME,
J. A. WARE.